United States Patent [19]

Zydek et al.

[11] Patent Number: 5,654,644
[45] Date of Patent: Aug. 5, 1997

[54] CIRCUITRY TO MONITOR AN INDUCTIVE CIRCUIT

[75] Inventors: Michael Zydek, Langgöns; Wolfgang Fey, Niedernhausen; Olaf Zinke, Hofheim, all of Germany

[73] Assignee: ITT Automotive Europe GmbH, Frankfurt, Germany

[21] Appl. No.: 360,672
[22] PCT Filed: Jun. 19, 1993
[86] PCT No.: PCT/EP93/01569
§ 371 Date: Dec. 20, 1994
§ 102(e) Date: Dec. 20, 1994
[87] PCT Pub. No.: WO94/00322
PCT Pub. Date: Jan. 6, 1994

[30] Foreign Application Priority Data

Jun. 27, 1992 [DE] Germany ............. 42 21 196.4

[51] Int. Cl.⁶ ................. G01R 27/26; G01R 31/06
[52] U.S. Cl. ............. 324/654; 324/545; 324/546; 324/547
[58] Field of Search ................. 324/545, 546, 324/547, 713, 715, 654, 656

[56] References Cited

U.S. PATENT DOCUMENTS

| | | | |
|---|---|---|---|
| 1,792,320 | 2/1931 | Peters et al. | 324/546 |
| 3,483,470 | 12/1969 | Tsergas | 324/545 |
| 3,667,034 | 5/1972 | Freeze | 324/546 |
| 3,838,891 | 10/1974 | Hamelin. | |
| 4,109,234 | 8/1978 | Davis. | |
| 4,893,085 | 1/1990 | Taruya et al. | 324/545 |
| 5,256,977 | 10/1993 | Domenichini et al. | 324/545 |
| 5,294,889 | 3/1994 | Heep et al. | 324/628 |

FOREIGN PATENT DOCUMENTS

| | | | |
|---|---|---|---|
| 0358887 | 3/1990 | European Pat. Off.. | |
| 2203307 | 5/1973 | Germany. | |
| 3007464 | 9/1981 | Germany. | |
| 3806649 | 9/1988 | Germany. | |
| 4010198 | 10/1991 | Germany. | |
| 4013393 | 10/1991 | Germany. | |
| 1321381 | 12/1989 | Japan. | |
| 0998976 | 2/1983 | U.S.S.R. | 324/654 |
| 1696866 | 12/1991 | U.S.S.R. | 324/654 |
| 2098746 | 11/1982 | United Kingdom | 324/654 |

*Primary Examiner*—Kenneth A. Wieder
*Assistant Examiner*—Diep Do
*Attorney, Agent, or Firm*—Thomas N. Twomey; J. Gordon Lewis

[57] ABSTRACT

A circuit to monitor a short circuit (or a line interruption) in an inductive circuit which is connected to a signal-processing circuit through a high-ohmic filter circuit. The monitoring circuit is formed as a component part of or as an additional element to the signal-processing circuit and initiates a test cycle to determine the inductance of the circuit to be monitored when, for example, the ignition of an automotive vehicle is turned on when the inductive circuit is used in the circuitry for sensing wheel rotation behavior of an automotive vehicle.

5 Claims, 3 Drawing Sheets

CIRCUITRY TO MONITOR AN INDUCTIVE CIRCUIT

This application is the U.S. national-phase application of PCT International application Ser. No. PCT/EP93/01569.

BACKGROUND OF THE INVENTION

The present invention relates to a circuit for monitoring an inductive circuit which is formed as part of a signal-processing circuit or as an additional element and which is connected, through a high-ohmic input circuit or filter circuit, to the signal-processing circuit. The monitoring initiates a test cycle to determine the inductance of the circuit to be monitored, including the filter circuit, if predetermined conditions apply and/or in predetermined intervals.

A monitoring circuit of this type is disclosed in EP 0 358 887 A1. In this monitoring circuit, the duration of a test signal passing through the inductive circuit to be monitored is monitored and evaluated with respect to proper duration by means of a time-difference measuring apparatus. To this end, the time difference of the duration of a signal, which is conducted to the time-difference measuring apparatus through the inductance and a time element, is compared to the signal which is conducted directly through an equal time element to the measuring apparatus.

Circuits of this type are particularly suitable to detect short circuits in the inductive transducer of a wheel sensor. If the short circuit is in the line leading to the transducer, in its input circuit or filter circuit, the short circuit is likewise detected in the monitoring operation. A line interruption is also detected. Sensors of this type, which are required in anti-lock systems or traction slip control systems of automotive vehicles, for example, are safety-critical component parts which should be checked permanently for operability, short circuits or line interruptions. In a low-ohmic input circuit or filter circuit, a short circuit may be detected relatively easily by determining the ohmic resistance between an output of the filter circuit and ground. For a high-ohmic filter circuit, such an arrangement is not suitable in practical operations because the ohmic internal resistance of the inductive circuit is low compared to the resistors in the circuit or input circuit. Therefore, the voltage drop, which may be measured at the output of the filter circuit when a current is applied, will be changed by a short circuit only to such a minor extent that reliable evaluation of the measurement results is not possible.

SUMMARY OF THE INVENTION

An object of the present invention is to provide a circuit for monitoring an inductive circuit which has a simple design, does not require additional terminals and permits detecting short circuits or line interruptions in a reliable manner, even if the inductive circuit is connected through a high-ohmic filter circuit or input circuit.

This object can be achieved by circuitry having the special features that, at the beginning of the test cycle, one of the two outputs of the filter circuit is connected to ground, while the second output is connected to a voltage source for a predetermined period, and the inductance is determined from the potential variation at a second output of the filter circuit.

It is expedient that the predetermined period corresponds at least to the transient time of the circuit to be monitored, including the filter circuit. Upon lapse of the predetermined time period and disconnection of the voltage source, the potential variation at the second output is evaluated to determine the inductance.

Also, symmetrically arranged filter circuits may be used, each of which has one high-ohmic series resistance in the lines leading from the inductive circuit to the signal-processing circuit, one capacitor interconnecting both outputs of the filter circuit, and one input capacitor which connects one of the outputs of the inductive circuit or one of the inputs of the filter circuit to ground.

To simplify the analysis of the signal, a d.c. voltage potential may be set for such a filter circuit by a voltage divider which is connected to a source of d.c. voltage on one side and to ground on the other side. When a line interruption occurs, an elevated potential difference results at the two inputs of the signal-processing circuit. However, the circuitry according to the present invention also allows detecting a line interruption by the consequent change in the inductance of the circuit to be monitored.

In another embodiment of the present invention, the monitoring circuit discharges the capacitor, which interconnects both outputs, instantaneously after or simultaneously with the disconnection of the voltage source by grounding the second output for a short interval. The analysis of the potential variation during the test cycle to determine the inductance of the inductive circuit is highly facilitated by this arrangement.

Further features, advantages and possible applications of the present invention will be understood from the following description with reference to the accompanying drawings.

DETAILED DESCRIPTION OF THE INVENTION

Figure 1:
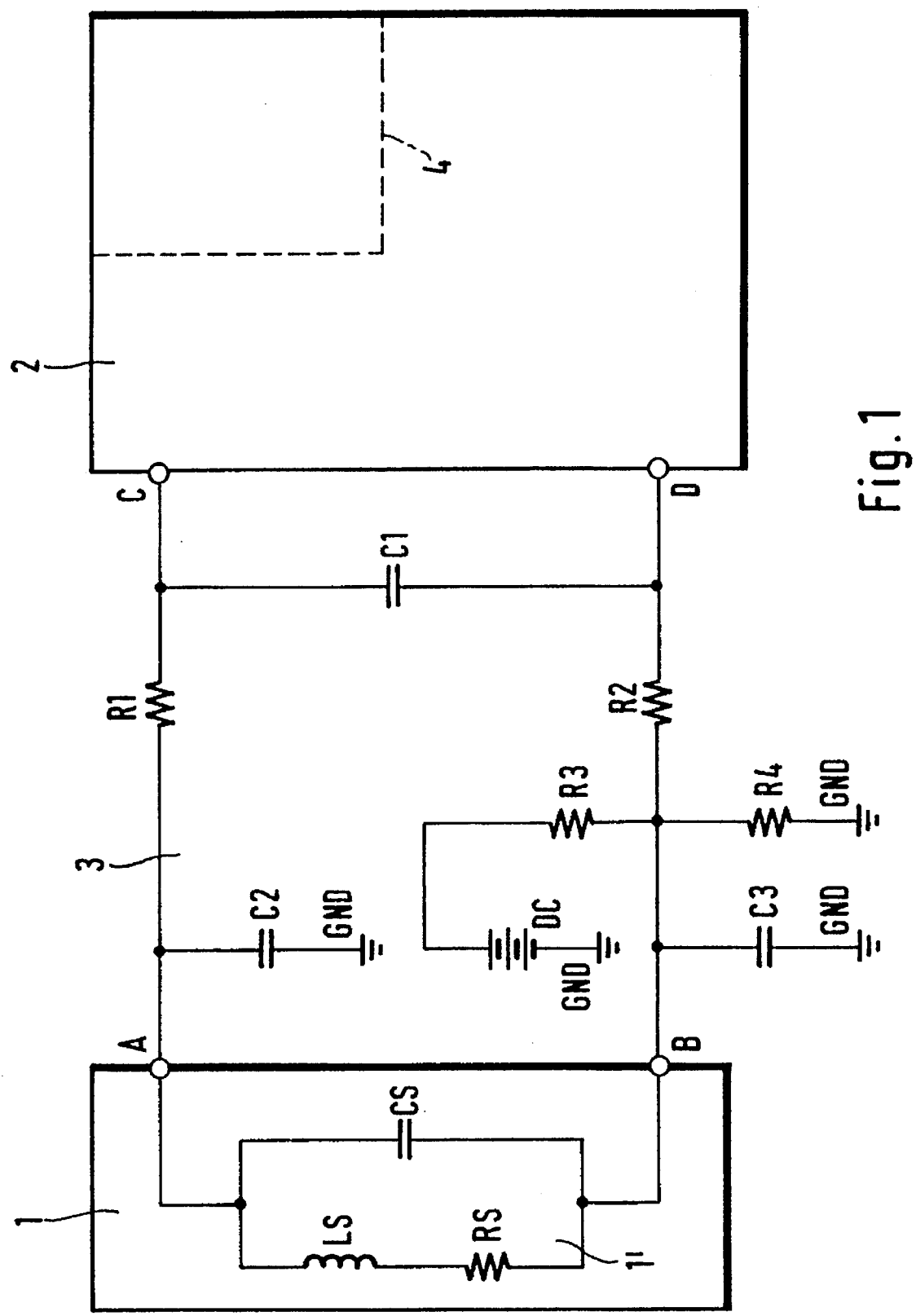
FIG. 1 is a circuit diagram of a monitoring circuit for an inductive circuit constructed in accordance with the present invention and one embodiment of a filter circuit or input circuit between the inductive circuit and a signal-processing circuit.

In FIG. 1, an equivalent circuit 1' of an inductive transducer 1, a signal-processing circuit 2 and a high-ohmic input circuit or filter circuit 3 are shown. The signal-processing circuit 2 includes, in dashed lines, a monitoring circuit 4, being part of the circuit 2, which initiates test cycles to determine the inductance of the inductive circuit 1 and evaluates the signals obtained and applied to the input terminals C and D of the signal-processing circuit 2.

The equivalent circuit 1' of the inductive circuit 1 to be monitored is formed of the series arrangement of an ohmic resistor RS and an inductance LS. A capacitor CS is connected in parallel to this series arrangement. The inductive circuit is, for example, an inductive transducer of a wheel sensor serving to measure the rotations of a wheel. Transducers of this type include coils in which an alternating voltage is induced on rotation of the wheel, the frequency and amplitude of which indicates the rotation. The output signal of the sensor, applied to the terminals A, B, is delivered to the signal-processing circuit 2, where it is processed and evaluated, through the filter circuit 3 which usually is positioned at the end of an electrical line.

The filter circuit 3 in FIG. 1 is arranged symmetrically. One series resistor R1, R2 is inserted in each of the two supply lines, which is high-ohmic as compared to the internal resistor RS of the sensor. A capacitor C1 interconnects the two outputs C, D of the filter circuit 3. Two further capacitors C2, C3, connected to ground, are provided on the side of the filter circuit 3 connected to the sensor. The capacitors C1, C2, C3, along with the ohmic resistors of the filter circuit and the internal resistor of the inductive circuit, form a low-pass filter.

Further, the filter circuit 3 according to FIG. 1 includes a voltage divider with the resistors R3, R4. The voltage divider is connected to the positive pole of the supply voltage source $V_{CC}$, on the one hand, and to ground GND, on the other hand.

The ohmic resistors R1, R2 are at least roughly identical. In the inactive condition, where no voltage is induced in the sensor 1, almost the same potential is applied to the terminals A, B, C, D, because the input terminal C, D of the signal-processing circuit 2 is high-ohmic. A line interruption in the sensor 1, or in the connecting line or in the input circuit 3 may be detected by means of the signal-processing circuit 2.

Figure 2:
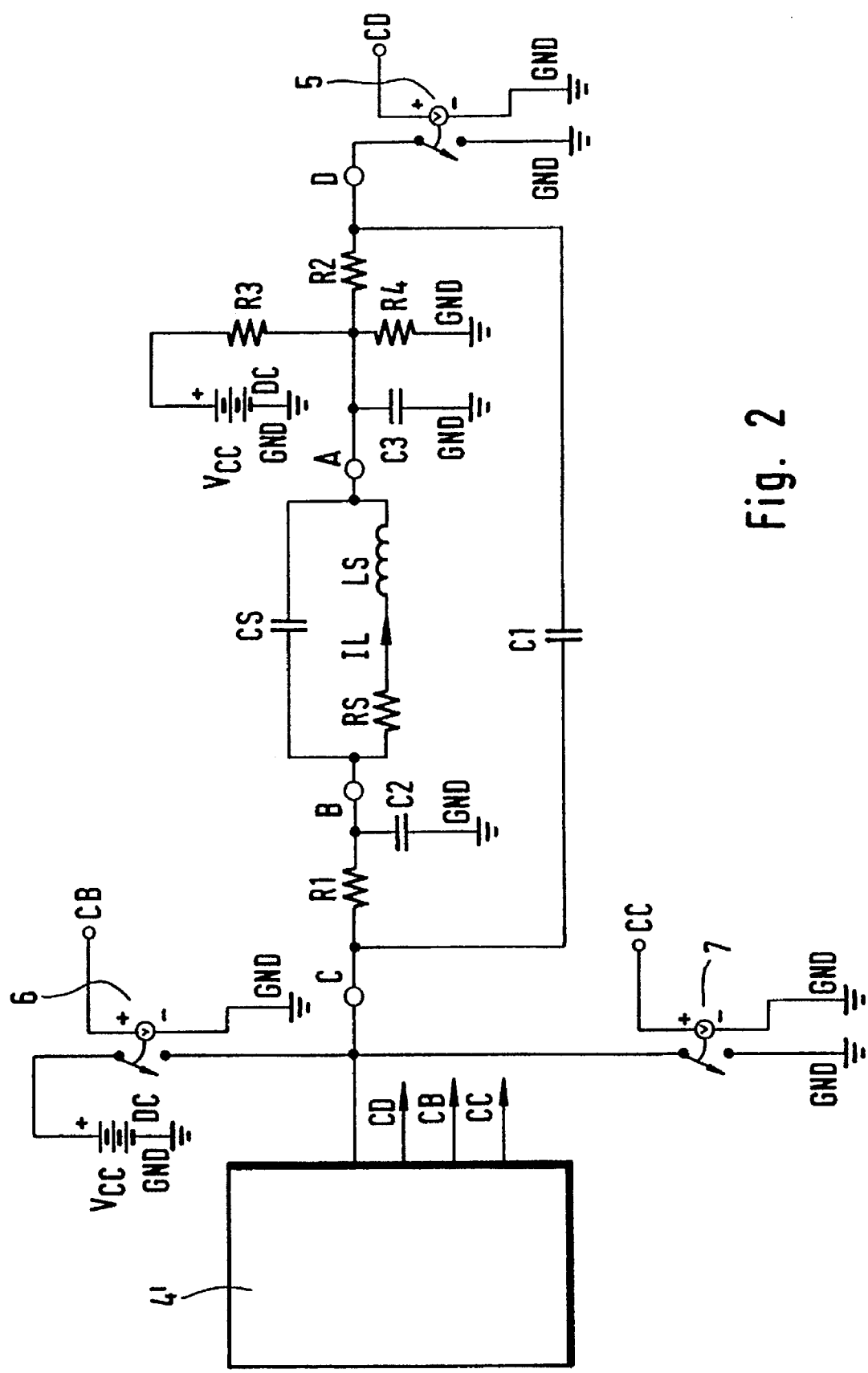
FIG. 2 is a circuit diagram of a modified form of the embodiment of FIG. 1.

FIG. 2 serves to explain the mode of operation of the circuitry according to the present invention, illustrating the circuit in FIG. 1, in a slightly modified representation, and in which, additionally, three transistor stages 5, 6, 7 or semiconductor switches are illustrated for an understanding of the function of the test cycles. Switches 5, 6, 7 are included in the monitoring circuit 4 of FIG. 1. In the illustration of the embodiment of FIG. 2, the monitoring circuit 4 is quasi split up into an evaluating and control circuit 4' and the semiconductor switches 5, 6, 7. The outputs of the evaluating and control circuit 4' leading to the control inputs of the switches 5, 6, 7 also are shown in FIG. 2 and and are identified by CB, CC, CD. Further, identical reference numerals have been assigned to like parts and like terminals in FIGS. 1 and 2.

The mode of operation of an embodiment of the circuitry according to the present invention is explained hereinbelow with reference to FIG. 2 in conjunction with the waveform diagrams in FIG. 3.

Monitoring operations are performed whenever the ignition of the vehicle is switched on, for example. No voltage is induced in the inductive transducer, the equivalent circuit 1' of which is shown, at this point in time because the wheels are not yet moving. Practically nothing changes in this condition when the vehicle rolls slowly.

The test cycle is now started by an output signal CD of the monitoring and control circuit 4'. By means of the transistor 5, the signal CD connects the terminal D of the signal-processing circuit 2 of FIG. 1 or the filter circuit 3 to ground GND at the point in time $t_0$. After a short transient time, a determined d.c. voltage potential is developed at the second terminal of the signal-processing circuit 2, i.e. at the terminal C, the magnitude of which potential is predetermined by the supply voltage $V_{CC}$ and by the voltage dividers R3, R4. At the point in time $t_1$, a signal CB, which drives the transistor 6 and results in closing of the semiconductor switch, causes the potential at terminal C to rise to the level of the energy supply of source $V_{CC}$.

The actual measuring operation, which is appropriate to determine the inductance and to detect short circuits, starts at the point in time $t_2$ which marks the termination of the actuating signal CB and, thus, the disconnection of the current source $V_{CC}$ from terminal C. The energy stored in the inductance LS in the presence of the signal CB, i.e. between the points in time $t_1$ and $t_2$, after the switch 6 is opened, results in the current IL being continued and, thus, in influencing the potential variation at the terminal or input C. The current IL flowing through the inductive circuit may be calculated from the ohmic resistors R1, R2, RS, R3 and R4 in the static condition, that means after the switch 6 (signal CB) has been actuated and the transient processes have faded.

A preferred feature in the present embodiment of the invention is that the input C is grounded for a very short interval $dt_3$ after the connection between the input C and the voltage source $V_{CC}$ has been interrupted by way of the semiconductor switch 6. This is done by actuating the switch 7 by means of a signal CC. By this provision, the capacitor C1 is discharged very quickly to full extent. The current IL through the inductance LS remains practically constant during this short interval.

The charging of C1 dictates the potential variation at terminal C after the short interval $dt_3$. Because a still higher potential is applied to point B than to point A, C2 discharges through the resistor RS of the inductive circuit as long as the potential is equal at points A and B. This discharging operation is assisted by the continuously flowing current IL, produced by the inductance LS, and by the now commencing charging current of capacitor C1. The result is that the potential at point B very quickly becomes less than the potential at point A, the charging of C1 being thereby delayed. After current IL has faded, which is produced by the energy stored in the inductance, an identical potential finally results at terminals A and B.

However, the previously described operations occur only when sensor 1 is intact. In the presence of a short circuit or a line interruption, the capacitor C1 is charged much quicker. This can be seen by observing and evaluating the potential variation at terminal C. The waveform diagrams in FIG. 3 illustrate this condition. The three top waveform diagrams show the course of the signals at the terminals CD, CB and CC. The switches, i.e. transistors 5, 6 and 7, are closed when an actuating signal "1" is applied.

Figure 3:
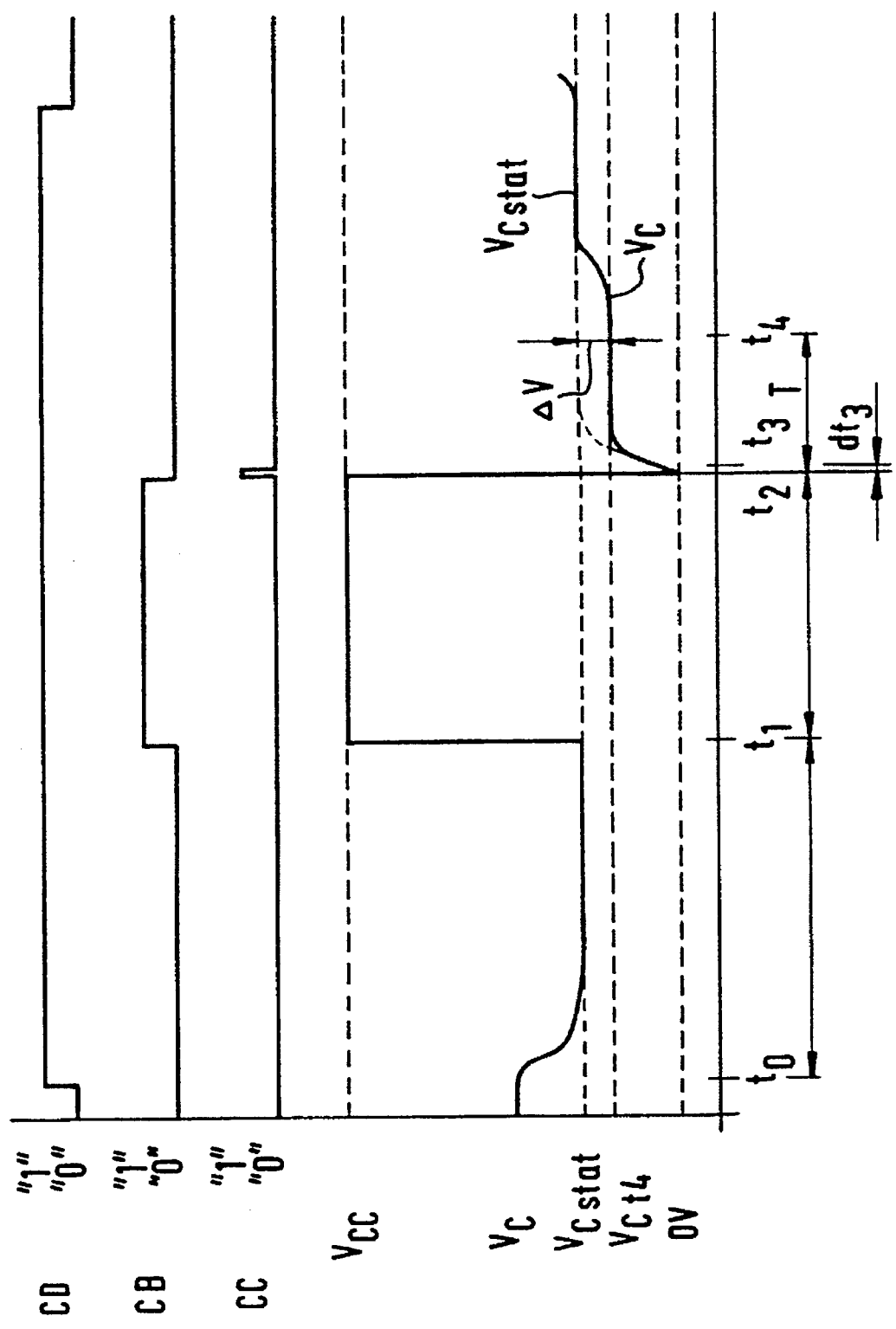
FIG. 3 shows a number of waveforms useful in understanding the operation of the circuitry of the embodiment of FIG. 2.

The potential variation at terminal C is also shown in FIG. 3. The potential $V_{Cstat}$ develops after actuation of the transistor 5 or grounding of terminal D of the signal-processing circuit 2. $V_{C t4}$ refers to the potential which develops at the point in time of measurement $t_4$ when the sensor and the sensor connection are intact in the absence of an error. The interval T is so selected, in conformity with the inductance LS of sensor 1, that the transient process is not yet terminated upon expiry of interval T with respect to pulse $dt_3$, that means at the point of time $t_4$, and roughly the maximum discrepancy V of the potential at terminal C from the static potential $V_{Cstat}$ occurs, with the sensor intact, that means in the absence of short circuits and line interruptions. If there is a defect, charging of the capacitor C1 terminates long before at the point of time $t_4$, and the potential at terminal C has risen to the value $V_{Cstat}$. The dashed line of the potential variation $V_C$ in FIG. 3 illustrates the conditions in the presence of a short circuit or a line interruption.

It should be noted for the sake of completeness that a time difference $(t_0-t_1)$ between the initiation of the signals CD and CB is unnecessary, if subsequently, that means prior to the termination of the signal CB and the almost instantaneous application of the short-time signal CC, the transient process and, thus, the occurrence of static conditions is awaited.

Modifications of the described circuitry and the actuation, as compared to the embodiments shown in FIGS. 2 and 3, are possible. It is in any case essential that the energy stored in the inductance of the sensor 1 has an effect on the potential variation at an output of the filter circuit 3 or at a terminal of the signal-processing circuit 2 and is evaluated for the monitoring operation.

We claim:

1. A circuit for monitoring an inductive circuit, said circuit comprising:

a signal processing circuit;

a filter circuit for connecting the inductive circuit to said signal-processing circuit, said filter circuit having first and second outputs and two parts with each part having a series resistor in a line leading from the inductive circuit to the signal-processing circuit, wherein said series resistor has a value sufficiently high such that a change in the voltage drop at said first and second outputs of said filter circuit upon a short circuit is minimized, said filter circuit providing a reliable measurement signal to said signal processing circuit;

a voltage source;

means for selectively connecting and disconnecting the first output of the filter circuit to ground and the second output of the filter circuit to said voltage source for a predetermined period of time; and means for determining the inductance of the inductive circuit from potential variations at the first output of the filter circuit.

2. A circuit according to claim 1 wherein:

(a) said connecting means connect the second output of the filter circuit to said voltage source for predetermined period of time which is at least the transient time of the inductive circuit being monitored, including the filter circuit, and (b) said determining means evaluate the potential variation at the second output of the filter circuit to determine the inductance of the inductive circuit upon lapse of the predetermined period of time and disconnection of the second output from said voltage source.

3. A circuit according to claim 2 wherein the filter circuit further has:

(a) two inputs, (b) a capacitor interconnecting the first and second outputs of the filter circuit, and (c) each part is symmetrically arranged and further has an input capacitor connecting one of the inputs of the filter circuit to ground.

4. A circuit according to claim 3 wherein the filter circuit further includes a voltage divider connected between said voltage source and ground and which sets a d.c. voltage potential for the filter circuit.

5. A circuit according to claim 4 further including switching means for connecting the second output of the filter circuit to ground for a short period of time after said voltage source is disconnected to immediately discharge the capacitor interconnecting the outputs of the filter circuit.

* * * * *